(12) United States Patent
Wang et al.

(10) Patent No.: US 10,713,703 B2
(45) Date of Patent: Jul. 14, 2020

(54) DIVERSITY IN MEDIA ITEM RECOMMENDATIONS

(71) Applicant: Apple Inc., Cupertino, CA (US)

(72) Inventors: Tao Wang, Saratoga, CA (US);
Jayasimha R. Katukuri, San Jose, CA (US); Venkat Kranthi Chalasani, Union City, CA (US); Venkatakrishnan S. Sundaranatha, San Jose, CA (US); Chandrasekar Venkataraman, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 356 days.

(21) Appl. No.: 15/631,386

(22) Filed: Jun. 23, 2017

(65) Prior Publication Data

US 2018/0150897 A1 May 31, 2018

Related U.S. Application Data (60) Provisional application No. 62/428,475, filed on Nov. 30, 2016.

(51) Int. Cl.
*G06F 16/2457* (2019.01)
*G06F 16/9535* (2019.01)
(Continued)

(52) U.S. Cl.
CPC ... *G06Q 30/0631* (2013.01); *G06F 16/24578* (2019.01); *G06F 16/41* (2019.01);
(Continued)

(58) Field of Classification Search
CPC .. G06F 16/24578; G06F 16/41; G06F 16/635; G06F 16/435; G06F 16/9535
(Continued)

(56) References Cited

U.S. PATENT DOCUMENTS 8,327,266 B2 * 12/2012 Svendsen ............... G11B 27/00
715/716
2012/0317123 A1 * 12/2012 Green ................. G06F 16/9535
707/748

(Continued)

FOREIGN PATENT DOCUMENTS

WO WO2014088564 6/2014

*Primary Examiner* — Michael Pham
(74) *Attorney, Agent, or Firm* — Fletcher Yoder, P.C.

(57) ABSTRACT

In some implementations, a computing device can improve diversity in media item recommendations. For example, the computing device can generate a satisfaction score representing an estimate of the amount satisfaction a user will experience when a candidate media item selected by the user is presented (e.g., played) by the system. The system can determine the difference in satisfaction scores for similar media items over time to determine the amount of satisfaction gained with a subsequent selection and presentation of similar candidate media items. The system can rank candidate media items based the satisfaction gain calculated for each candidate media item and select suggested media items to present to the user based on the candidate media items having the highest satisfaction gain. In some implementations, the computing device can generate satisfaction scores based on an adventurousness score calculated for the user.

21 Claims, 5 Drawing Sheets

(51) Int. Cl.
*G06F 16/635* (2019.01)
*G06F 16/435* (2019.01)
*G06F 16/41* (2019.01)
*G06Q 30/06* (2012.01)
*H04L 29/08* (2006.01)

(52) U.S. Cl.
CPC .......... *G06F 16/435* (2019.01); *G06F 16/635* (2019.01); *G06F 16/9535* (2019.01); *H04L 67/306* (2013.01)

(58) Field of Classification Search
USPC ........................................................ 707/732
See application file for complete search history.

(56) References Cited

U.S. PATENT DOCUMENTS

| 2015/0242750 | A1* | 8/2015 | Anderson | G06F 16/3347 |
| | | | | 706/50 |
| 2016/0086086 | A1 | 3/2016 | Gabillon et al. | |

* cited by examiner

DIVERSITY IN MEDIA ITEM RECOMMENDATIONS

RELATED APPLICATION

This application claims the benefit of U.S. Provisional Application No. 62/428,475, filed on Nov. 30, 2016, the contents of which is incorporated by reference herein in its entirety.

TECHNICAL FIELD

The disclosure generally relates to generating media item recommendations.

BACKGROUND

There are many streaming media services that provide users online, near instantaneous access to media content, such as music, movies, television shows, radio talk shows, and the like. Often these media services provide media recommendations based on user specified media preferences and/or implied media preferences. For example, a user's media preferences can be implied based on which media items the user has selected in the past. However, media recommendations generated based on user specified preferences and/or implied preferences often lack enough diversity to keep a user satisfied with the recommendations and/or the streaming media service that provides the recommendations.

SUMMARY

In some implementations, a computing device can improve diversity in media item recommendations. For example, the computing device can generate a satisfaction score representing an estimate of the amount satisfaction a user will experience when a candidate media item selected by the user is presented (e.g., played) by the system. The system can determine the difference in satisfaction scores for similar media items over time to determine the amount of satisfaction gained with a subsequent selection and presentation of similar candidate media items. The system can rank candidate media items based the satisfaction gain calculated for each candidate media item and select suggested media items to present to the user based on the candidate media items having the highest satisfaction gain. In some implementations, the computing device can generate satisfaction scores based on an adventurousness score calculated for the user.

Particular implementations provide at least the following advantages. The computing device can recommend content relevant to the user while also adding diversity to the recommendations. Diversity in media item recommendations can be increased while staying within a user's media preferences. By increasing the diversity of suggested media items, the computing device can keep a user interested in the media services and/or suggestions provided by the computing device.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Figure 1A:
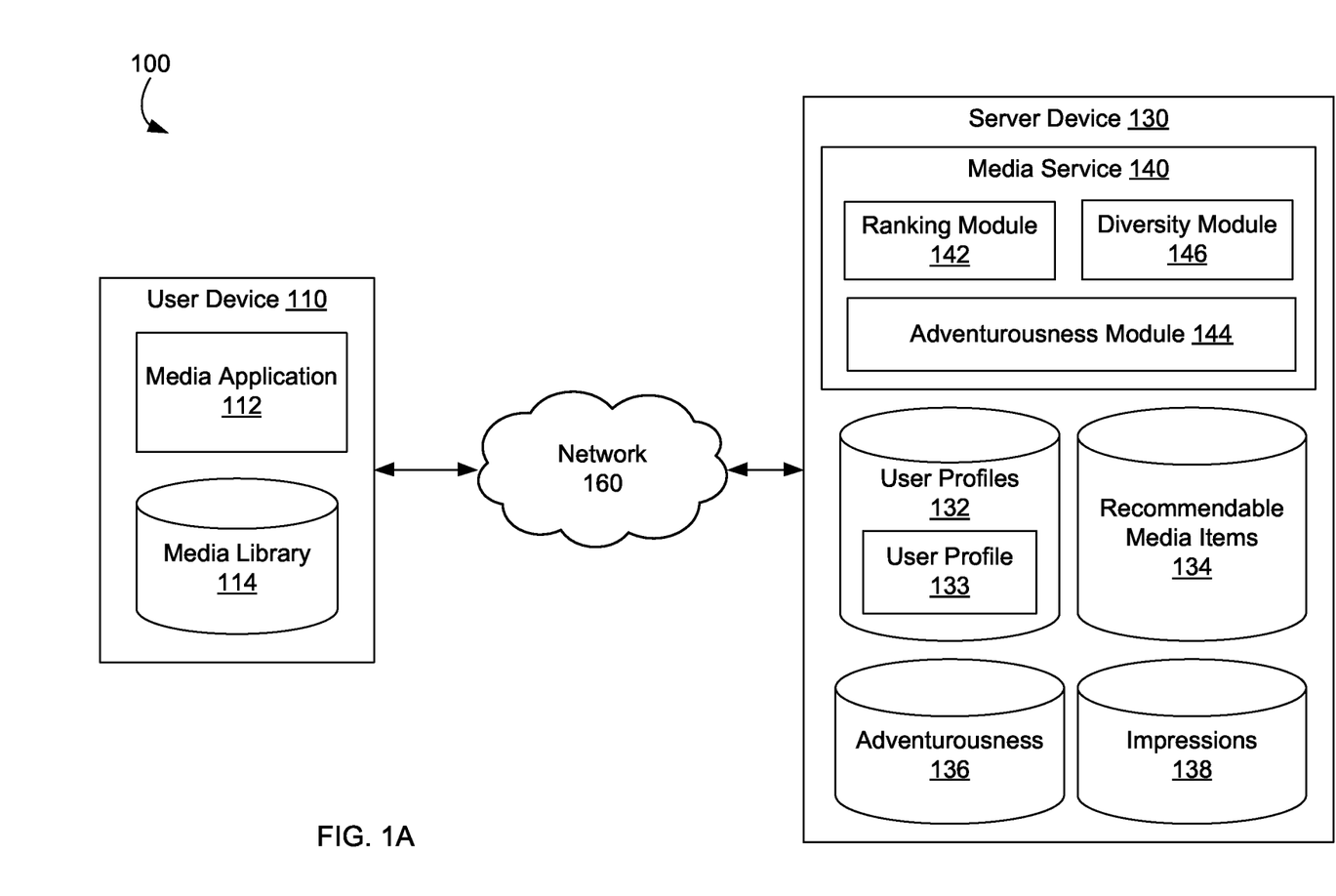
FIG. 1A illustrates a system for improving diversity in media item recommendations.
Figure 1B:
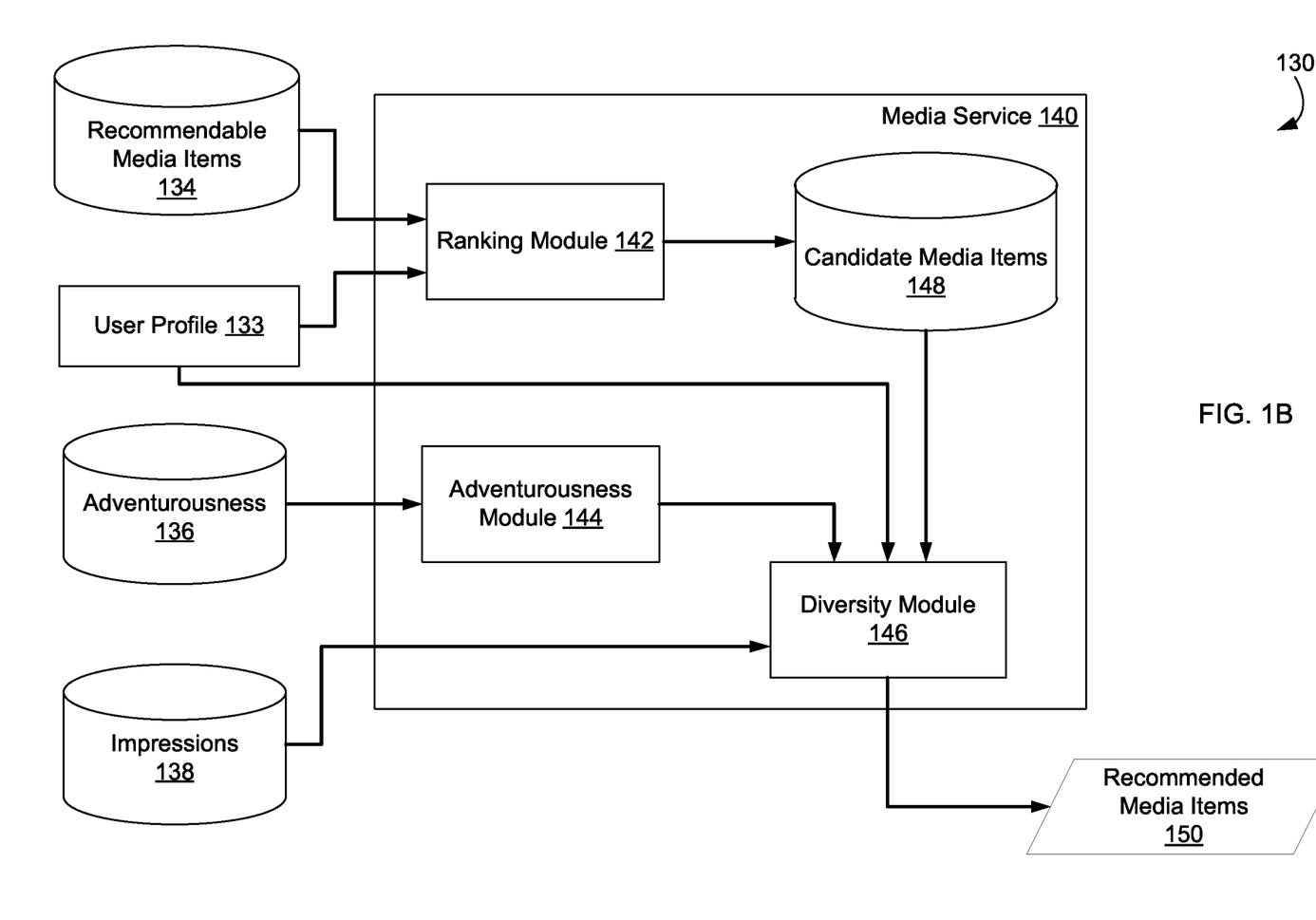
FIG. 1B illustrates a system for improving diversity in media item recommendations.

FIG. 1A and FIG. 1B illustrate a system 100 for improving diversity in media item recommendations. For example, system 100 can correspond to a media provisioning system that provides a user of user device 110 access to media items served by server device 130 through network 160 (e.g., a local area network, wide area network, the Internet, etc.). As described in detail below, server device 130 can track the user's media consumption habits to determine the user's preferred media items and/or to determine how adventurous the user is with respect to selecting and consuming new media items that the user has not previously selected. Based on the determined adventurousness of the user, system 100 can predict or estimate how satisfied a user will be when the user selects, views, and/or consumes various candidate media items. System 100 can then present media item suggestions to the user based on which candidate media items will result in the highest increase in user satisfaction when selected and/or consumed by the user.

Referring to FIG. 1A, in some implementations, system 100 can include user device 110. For example, user device 110 can be a laptop computer, desktop computer, smartphone, tablet computer, wearable device, or any other computing device. A user of user device 110 can interact with user device 110 to search, browse, and/or obtain media items for consumption (e.g., viewing, listening, etc.) by the user. Media items received by user device 110 from server device 130 can include individual media items, such as individual songs, tracks, videos, movies, television show episodes, etc. Media items received by user device 110 can include media item collections, such as playlists, albums, episodic media, etc.

In some implementations, user device 110 can include media application 112. For example, media application 112 can be a software application that is a client of a media service (e.g., media service 140) provided by server device 130. Media application 112 can present graphical user interfaces (GUI) on a display of user device 110 for presenting media items (e.g., media item content, video, music, etc.) and/or representations of media items (e.g., metadata, images, descriptions, etc.) received by user device 110 from server device 130. In some implementations, media application 112 can receive media item suggestions from server device 130 and present the media item suggestions (e.g., suggested music, videos, playlists, albums, etc.) on a GUI of media application 112.

In some implementations, media application 112 can send user preference information to server device 130. For example, media application 112 can maintain and/or monitor media library 114 on user device 110 and/or track playback of media items on user device 110 to determine which media items the user of user device 110 has purchased, played, and/or added to media library 114. Media application 112 can generate user preference information identifying which media items the user has purchased and/or played and send the user preference information to server device 130.

In some implementations, system 100 can include server device 130. For example, server device 130 can be a network (e.g., cloud) computing device that provides a media service that allows a user to search, browse, and consume media items through media application 112 on user device 110.

In some implementations, server device 130 can include media service 140. For example, media service 140 can be a media provisioning service (e.g., a subscription service, a streaming service, etc.) that sends media items and/or media item metadata to user device 110 so that the user of user device 110 can browse, search, and/or playback media items over network 160.

In some implementations, media service 140 can generate media item suggestions for the user of user device 110. For example, media service 140 can collect user preference information for the user of user device 110 describing the user's media playback and/or purchase habits. Based on the user preference information, media service 140 can generate user profile 133 for the user and store user profile 133 in user profiles database 132. For example, user profiles database 132 can include user profiles for many different users of many different user devices (e.g., user device 110).

In some implementations, user profile 133 can include an affinity profile. For example, the affinity profile can be generated based on a user's previous media item activity (e.g., selection, consumption, purchases, etc.). For example, the media item profile can include affinity scores that describe the user's preference for, interest in, or attraction to media items associated with a variety of categories. For example, each media item category (e.g., artist, genre, actors, directors, etc.) can have a corresponding vector that has as 'n' entries. Each vector entry can be a key-value pair, where the key is a particular instance of the category and the value is the affinity score for the instance. Using the "artist" category as an example, the "artist" vector can include three (3) entries [Michael Jackson:0.9; Alicia Keys:0.3; Alan Jackson:0.4] representing the users' affinity for these artists based on the user's previous selections. Thus, in the "artist" category example, the particular "artist" category instances "Michael Jackson;" "Alicia Keys;" and "Alan Jackson" having respective affinity scores 0.9; 0.3; and 0.4. Similarly, using the "genre" category as an example, the "genre" vector can include (3) entries [Jazz:0.2; Classic Rock:0.4; Country:0.8] representing the user's affinity for these genres based on the user's previous selections. Thus, in the "genre" category example, the particular instances "Jazz;" "Classic Rock;" and "Country" have respective affinity scores 0.2; 0.4; and 0.8 Similar affinity vectors can be generated for other media item categories, such as actors, directors, studios, etc.

In some implementations, media service 140 can generate affinity scores based on media items the user has previously selected. For example, the affinity scores can be generated based on the number of times a user has selected to play, view, or purchase a media item associated with a particular category instance for which the affinity score is generated. For example, media service 140 can generate an affinity score for the artist Michael Jackson based on a ratio of the number of Michael Jackson media items purchased by the user over the total number of media items purchased by the user. Thus, if the user has purchased 20 Michael Jackson songs and the user has previously purchased 1000 songs, the affinity score for Michael Jackson in the "artists" vector can be 20/1000 or 0.2. The "artist" affinity vector can include all artists associated with media items that the user has purchased, played, or otherwise consumed Similar affinity score calculations can be performed for instances in the other media item categories (e.g., genre, actors, directors, etc.). To generate affinity scores, media service 140 can maintain a count of the number of purchases, plays, etc., associated with each category instance. Media service 140 can maintain the count in the user profile corresponding to the user.

In some implementations, server device 130 can include adventurousness database 136. For example, adventurousness database 136 can store adventurousness data for various users of media service 140. Each record in database 136 can, for example, map a user identifier to corresponding adventurousness data for the identified user.

In some implementations, the adventurousness data can include a churn count. For example, the churn count can include a count of the number of media items associated with a new category instance that the user has played, viewed, or purchased in the past 30 days (or some other period of time). For example, each day, media service 140 can count how many media items associated with a new category instance the user has played, viewed, or purchased. Plays and/or views can be counted when the play or view exceeds a threshold period of time (e.g., 20 seconds, 10 minutes, etc.). Purchases can always be counted. Using the "artist" category as an example again, when the user selects to play or purchase a song by the artist "Michael Buble" and "Michael Buble" does not currently exist in the "artists" vector, media service 140 can add one media item to the churn count for the day on which the user selected to purchase or play the song by Michael Buble. Media service 140 can create a churn count each day for a sliding 30 day window (e.g., the current day to 30 days ago). The churn counts can be stored in adventurousness database 136 and can be used to generate an adventurousness score, as described further below.

In some implementations, adventurousness data can include information describing how long the user consumes media items per day. For example, media service 140 can keep track of how long the user plays media items each day and record the play duration in adventurousness database 136 associated with the user. Media service 140 can record play durations in adventurousness database 136 for each day over a 30 day window, similar to the churn counts described above. Thus, adventurousness database 136 will include play durations for each of the past 30 days from the current day.

In some implementations, server device 130 can include impressions database 138. For example, impressions database 138 can store impressions data describing how many times media items recommendations associated with a particular category instance have been viewed by the user. Each record in impressions database 138 can map an identifier for a user to corresponding impressions data. For example, every time a song by the artist "Michael Jackson" is suggested to the user by media service 140 (e.g., through media application 112) and the user has viewed the suggestion, media service 140 can increment a "Michael Jackson" impression counter in impressions database 138 to indicate how many times a Michael Jackson song has been suggested to and/or viewed by the user. Similar impression counts can be maintained for other artists in the "artist" category and for other category instances (e.g., Jazz, Classic Rock, Country, etc.) in other categories (e.g., genre, actors, directors, etc.).

In some implementations, the impression counts can be stored as a vector. For example, each category can have a corresponding vector that indicates the counts for each instance of the category. For example, if the user has previously viewed 3 suggestions associated with Michael Jackson, 1 suggestion associated with Alicia Keys, and 5 suggestions associated with Alan Jackson, the impression count vector for the "artists" category can be [Michael Jackson:3; Alicia Keys:1; Alan Jackson:5]. If the user viewed a media item collection suggestion (e.g., playlist), the counters can be incremented according to a proportion or ratio representing the artists (or genres, etc.) contribution to the media item collection. Thus, a counter may be increased by 0.6 or 0.4 depending on a particular artist's, genre's, director's, etc., contribution to a playlist or album. These impression count vectors can be used to determine satisfaction scores, as described further below.

In some implementations, server device 130 can include recommendable media items database 134. For example, database 134 can include media items (e.g., songs, movies, videos, television shows, playlists, albums, etc.) that are available to media service 140 for recommendation to the user. Each media item can be associated with metadata describing the various media item categories and/or category instances with which the media item is associated. For example, songs in database 134 can have metadata describing the artist (e.g., Michael Jackson), genre (e.g., Pop), and/or other category information associated with music. Movies in database 134 can have metadata describing actors, genre, directors, and/or other metadata typical of movies.

Referring to FIG. 1B, in some implementations, media service 140 can include ranking module 142. For example, ranking module 142 can generate a ranked or ordered list of candidate media items 148 to recommend to the user based on the affinity scores in user profile 133 and the media items in recommendable media items database 134. The candidate list of media items may include only the media items for which the user already has an affinity (e.g., by artist, genre, actors, directors, etc.). Candidate media items list 148 can be generated for each type of media item (e.g., songs, movies, playlists, albums, etc.) that may be recommended by media service 140. Candidate media items list 148 can be generated on a periodic basis (e.g., every 10 days). Candidate media items list 148 can be generated as needed (e.g., when every media item in the list has already been considered or presented to the user). Candidate media items list 148 can be generated when user profile 133 changes in some significant way (e.g., a change in affinity scores, a change in affinity vectors, etc.).

In some implementations, ranking module 142 can generate candidate media items 148 by ranking media items in recommendable media items database 134 based on affinity scores. For example, if "artist" is the only category used to rank media items in recommendable media items 134 and the artist affinity vector is [Michael Jackson:0.9; Alicia Keys:0.3; Alan Jackson:0.4], then media items associated with Michael Jackson will have an affinity score of 0.9, media items associated with Alicia Keys will have an affinity score of 0.3, and media items associated with Alan Jackson will have an affinity score of 0.9.

In some implementations, the affinity score for an item can be determined by calculating the dot product of the affinity vector for a category and a vector representing the attributes of the media item for which the affinity score is being calculated. For example, when determining an affinity score for a media item based on the "artist" category where the media item is a Michael Jackson song, ranking module 142 can calculate the dot product of the artist affinity vector [Michael Jackson:0.9; Alicia Keys:0.3; Alan Jackson:0.4] and a vector representing the attributes of (e.g., artists associated with) the media item [Michael Jackson:1; Alicia Keys:0; Alan Jackson:0], Thus, the affinity score of the Michael Jackson song may be 0.9 when the dot product of artist affinity vector [Michael Jackson:0.9; Alicia Keys:0.3; Alan Jackson:0.4] and media item artist attribute vector [Michael Jackson:1; Alicia Keys:0; Alan Jackson:0] is calculated.

Similarly, when calculating affinity scores for media item collections, the media item attribute vector can include values representing the proportion or ratio of the media item associated with each category instance. Thus, when determining an affinity score for a playlist that includes 6 songs by Alicia Keys and 4 songs by Michael Jackson, the artist attribute vector for the playlist can be [Michael Jackson:0.4; Alicia Keys:0.6; Alan Jackson:0]. The affinity score for the media item can then be calculated by computing the dot product of the artist category affinity vector [Michael Jackson:0.9; Alicia Keys:0.3; Alan Jackson:0.4] and the artist attribute vector [Michael Jackson:0.4; Alicia Keys:0.6; Alan Jackson:0] for the playlist.

After determining the affinity scores for each media item, ranking module 142 can generate candidate media items 148 by ranking or ordering the media items according to their respective affinity scores, where media items having higher affinity scores are ranked higher than media items having lower affinity scores.

When ranking media items using multiple categories (e.g., artist and genre), media service 140 can calculate a weighted sum of the affinity scores to generate a ranking for each media item. For example, the weighted sum can be represented by "overall_score=$w_{artist}$(aff_score$_{artist}$)+$w_{genre}$(aff_score$_{genre}$)+ . . . +$w_{category}$(aff_score-$_{category}$). Thus, if the genre vector is [Jazz:0.2; Classic Rock:0.4; Country:0.8] and the artist vector is [Michael Jackson:0.9; Alicia Keys: 0.3; Alan Jackson:0.4] and artist and genre categories are weighted equally (e.g., 1), a media item associated with the artist Alan Jackson and Country may have an overall affinity score of 1.2. In some implementations, different categories can be weighted differently based on the categories' importance. After determining the overall affinity scores for each media item, ranking module 142 can rank or order media items according to their respective overall affinity scores to generate candidate media items 148, where media items having higher affinity scores are ranked higher than media items having lower affinity scores.

In some implementations, media service 140 can include adventurousness module 144. For example, adventurousness module 144 can generate an adventurousness score for the user that represents how willing the user is to explore or experience new media items. For example, adventurousness module 144 can generate the adventurousness score for the user based on the churn count described above, play duration, and/or age or other demographics. For example, adventurous module 144 can obtain the churn count and play duration information for the user from adventurousness database 136. Adventurousness module 144 can obtain age and/or other demographic information for the user from user profile 133.

To generate the adventurousness score, module 144 can select a churn count for the user. For example, module 144 can obtain the churn count for a previous number (e.g., 30, 15, 5, etc.) of days from adventurousness database 136. Module 144 can order the churn count for the previous number of days based on the churn count for each day. If the previous five days are used and the churn counts are [2, 0, 1, 1, 3] for the last 5 days, then the ordered churn count is

[3, 2, 1, 1, 0]. Module 144 can remove the top 90% (or 80%, or 75%, etc.) of elements (e.g., churn count=3) and select the highest churn count remaining (e.g., churn count=2) for determining the user's adventurousness score.

Similarly, module 144 can select a play duration for the user. For example, module 144 can obtain the play durations for the previous number (e.g., 30, 15, 5, etc.) of days from adventurousness database 136. Module 144 can order the play durations for the previous number of days based on the play duration for each day. If the previous five days are used and the play durations (e.g., in minutes) are [35, 40, 15, 27, 69] for each of the last 5 days, then the ordered play durations are [69, 40, 35, 27, 15]. Module 144 can remove the top 90% (or 80%, or 75%, etc.) of elements (e.g., play duration=69) and select the highest play duration remaining (e.g., play duration=40).

After selecting the churn count and play duration for the user, module 144 can group the user with other users having similar user characteristics. For example, module 144 can group the user with other users having similar play durations so that the user's adventurousness is determined in relation to other users having similar media consumption habits. Alternatively, module 144 can group the user with other users based on other demographics, such as age, geographical location (e.g., residence), or other user characteristics.

After grouping the user with other similar users, module 144 can order or rank the users in the group based on the selected churn count for each user. For example, module 144 can generate a churn score for each user within the group corresponding to the selected churn count for each user. Alternatively, module 144 can generate a churn score for each user within the group corresponding to a ratio of the selected churn count over the selected play duration for each user (e.g., churn count/play duration). Module 144 can then order or rank the users within the group based on the generated churn score for each user, where higher churn scores are ranked or ordered higher than lower churn scores.

After ranking or ordering the users within the group, module 144 can determine an adventurousness score for the user based on the user's position or ranking within the group. For example, if the user is in the 15$^{th}$ position (e.g., 15$^{th}$ highest rank/order) out of 1000 users in the group, then the user's adventurousness score (adv_score) can be 15/1000 or 0.015. Adventurousness module 144 can provide the user's adventurousness score to diversity module 146 so that diversity module 146 can generate satisfaction scores based on the user's adventurousness score. Alternatively or additionally, adventurousness module 144 can store the adventurousness score in adventurousness database 136 and diversity module 146 can obtain the user's adventurousness score from user's record in adventurousness database 136.

In some implementations, media service 140 can include diversity module 146. For example, diversity module 146 can determine which media items in candidate media items 148 to recommend or suggest to the user based on the user's adventurousness score. For example, the adventurousness score can be used by diversity module 146 to estimate how much satisfaction the user will get from playing a media item in candidate media items 148. Diversity module 146 can determine, based on the satisfaction estimate, how much additional satisfaction (e.g., satisfaction gain) the user will get from viewing a media item in candidate media items 148. Diversity module 146 can then recommend media items to the user that will result in the greatest satisfaction gain when viewed by the user.

In some implementations, diversity module 146 can skip or filter out media items for which the user has indicated a lack of interest. For example, diversity module can determine, e.g., based on impression count, that the user has viewed media items associated with Alan Jackson 10 times but has never selected any of the media items associated with the artist Alan Jackson. When the number of impressions for a category instance without triggering a user selection exceeds a threshold value (e.g., 10, 15, 4, etc.), diversity module 146 can determine that the user is not interested in media items associated with the category instance (e.g., artist: Alan Jackson) and can skip media items in candidate media items 148 associated with the category instance.

In some implementations, diversity module 146 can estimate or predict a user's satisfaction associated with viewing a candidate media item based on the user's adventurousness score. For example, diversity module 146 can define a submodular function:

$$f(x) = \text{const\_a} * x^{1 - \frac{adv\_score}{const\_b}}, \quad 1)$$

where adv_score is the adventurousness score calculated for the user and const_a and const_b are some configured constant value (e.g., 0.5, 2, 3, etc.).

In some implementations, diversity module 146 can calculate a current satisfaction score based on candidate media items already selected for suggestion or presentation to the user. If no candidate media items have been selected yet (e.g., the selection process has just started), then the current satisfaction score can be zero (0).

To generate a current satisfaction score for a candidate media item, diversity module 146 can apply the submodular function f(x) to a category attribute (e.g., genre, artist, etc.) vector for the already selected candidate media items. For example, if the satisfaction gain for the candidate media item is determined based on the "artist" category, then diversity module 146 can calculate the current satisfaction score for the user based on the "artist" category attribute vector associated with the selected media items. If the "artist" category attribute vector is [Michael Jackson:0.6; Alicia Keys:0.4; Alan Jackson:0], then diversity module 146 can generate a modified artist category vector [Michael Jackson: f(0.6); Alicia Keys:f(0.4); Alan Jackson:f(0)]. If multiple media items are currently selected, the artist attribute vectors for the different selected media items can be added (e.g., union) together before applying the submodular function. Diversity module can then determine the user's current satisfaction score by calculating the dot product between the modified artist attribute vector (e.g., [Michael Jackson:f (0.6); Alicia Keys:f(0.6); Alan Jackson:f(0)]) and the user's "artist" affinity vector (e.g., [Michael Jackson:0.9; Alicia Keys:0.3; Alan Jackson:0.4]).

To determine the user's increase in satisfaction (e.g., satisfaction gain) when presented with a candidate media item that has not already been selected, diversity module 146 can determine a future satisfaction score by adding the candidate media item's attribute vector to the attribute vectors of media items that have already been selected for presentation to the user. For example, a playlist (e.g., media item) having an artist attribute vector [Michael Jackson:0.6; Alicia Keys:0.4; Alan Jackson:0] may have already been selected for presentation to the user. When determining which additional media items to suggest to the user, diversity module 146 can add (e.g., union) the candidate media item's artist attribute vector (e.g., [Michael Jackson:0; Alicia Keys:

0; Alan Jackson:1]) to the artist attribute vectors for the already selected media items (e.g., [Michael Jackson:0.6+0; Alicia Keys:0.4+0; Alan Jackson:0+1]). Diversity module 146 can then apply the submodular function to the combined artist attribute vectors [Michael Jackson:f(0.6+0); Alicia Keys:f(0.4+0); Alan Jackson:f(0+1)]) and calculate the dot product between the user's artist affinity vector and the combined (e.g., added, unioned, etc.) artist attribute vectors associated with the already selected candidate media items to generate the future satisfaction score.

Diversity module 146 can then calculate the difference between the current satisfaction score and the future satisfaction score to determine the satisfaction gain. For example, when selecting the first candidate media item to present to the user the current satisfaction score will be zero. Thus, the satisfaction gain for each candidate media item when no previous media items have been selected will simply be the future satisfaction score generated for the media items.

In some implementations, diversity module 146 can calculate satisfaction gain for a candidate media item based on the satisfaction gain calculated for multiple categories (e.g., artist, genre, etc.). To calculate satisfaction gain using multiple categories, diversity module 146 can calculate a weighted sum of the satisfaction gains for each category.

In some implementations, diversity module 146 can iteratively rank candidate media items based on satisfaction gain. The satisfaction gain calculation can be performed for each unselected candidate media item to determine which candidate media item to select as a suggested media item. After selecting a media item to suggest, diversity module 146 can perform the satisfaction gain calculations again for the remaining candidate media items, re-rank the candidate media items according to satisfaction gain, and select the highest ranking candidate media item as the next suggested media item. This iterative process can continue until the desired number of suggested media items is selected.

For example, if diversity module 146 is configured to select six media items to suggest to the user, then diversity module 146 can perform the satisfaction gain calculation on each candidate media item and select the first suggested media item based on whichever candidate media item has the highest satisfaction gain. After selecting the first suggested media item, diversity module 146 can perform the satisfaction gain calculation again for each unselected candidate media item. Satisfaction gain calculations performed after selecting a suggested media item will produce different results because the satisfaction gain calculation is based on the attribute vectors of previously (e.g., already) selected media items. This iterative process of selecting suggested media items based on highest satisfaction gain and recalculating satisfaction gain for subsequent selections can continue until the desired number of suggested media items has been selected.

In some implementations, diversity module 146 can select media item candidates from a subset of candidate media items 148. For example, instead of determining the satisfaction gain for every media item in candidate media items 148, diversity module 146 can analyze a smaller subset of media items from candidate media items 148. The smaller subset can be, for example, some multiple of the number of recommendations to be made by diversity module 146. If diversity module 146 is to select 8 media items to recommend to the user, diversity module 146 can select the top 40 (e.g., 5×8) media items from candidate media items 148 to analyze for satisfaction gain and select the top 8 media items having the greatest satisfaction gain from the 40 media item subset of candidate media items 148, for example.

In some implementations, diversity module 146 can select media items to recommend for a multi-day period of time. For example, rather than selecting media items to suggest based on satisfaction gain each day, diversity module 146 can select media items to recommend for an entire week period, 10 day period, etc. For example, if diversity module 146 is to suggest 6 media items to the user each day for a 10 day period, diversity module 146 can select 60 media items from candidate media items 148 based on satisfaction gain and then present 6 media items from the pre-selected 60 media items each day until each of the 60 preselected media items has been presented. Thus, diversity module 146 can perform the satisfaction gain calculation once for the configured period of time (e.g., one week, 10 days, 2 weeks, etc.).

Figure 2:
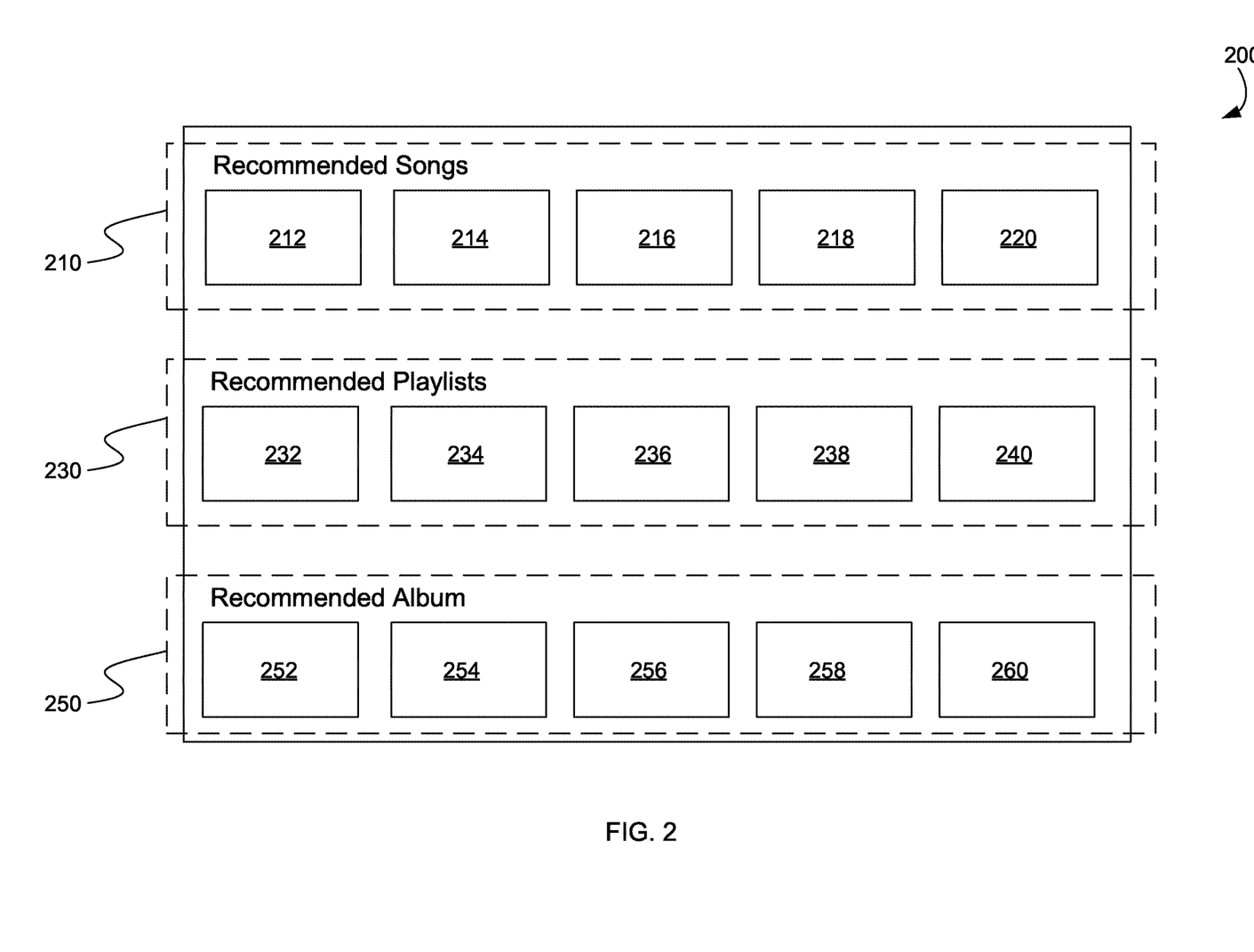
FIG. 2 illustrates an example graphical user interface for presenting media item suggestions.

In some implementations, media service 140 can send recommended media items 150 to media application 112 on user device 110 for presentation to the user. For example, media application 112 can present the media item recommendations on GUI 200, described below. When media service 140 sends the recommended media items 150 to user device 110, media service 140 can increment the presentation counters corresponding to the category instances associated with the presented media items. Thus, instead of selecting media items based only on the user's affinity or preference for media items from particular artists, genres, etc., media service can reorder candidate media items based on the number of times a particular artist, genre, etc. is presented to the user and an estimate of the satisfaction gain the user will likely experience from seeing more diversified media item recommendations.

FIG. 2 illustrates an example graphical user interface 200 for presenting media item suggestions. For example, GUI 200 can be presented by media application 112 on user device 110 in response to the user invoking media application 112. When invoked, media application 112 can request media item suggestions from media service 140. Media service 140 can send to media application 112 media item metadata corresponding to the suggested media items selected according to the satisfaction gain calculations described herein.

In some implementations, GUI 200 can include recommended songs 210. For example, recommended songs 210 can include representations 212-220 of songs (e.g., media items) recommended by media service 140 based on the user affinity scores, adventurousness scores, and satisfaction gain determined by media service 140.

In some implementations, GUI 200 can include recommended playlists 230. For example, recommended playlists 230 can include representations 232-240 of playlists (e.g., media items, media item collections) recommended by media service 140 based on the user affinity scores, adventurousness scores, and satisfaction gain determined by media service 140. When recommending playlists, media service 140 can determine affinity for a playlist based on the specific artist, genre, etc., that appears most frequently in the playlist, as described above.

In some implementations, GUI 200 can include recommended albums 250. For example, recommended albums 250 can include representations 252-260 of albums (e.g., media items, media item collections) recommended by media service 140 based on the user affinity scores, adventurousness scores, and satisfaction gain determined by media service 140. When recommending albums, media service 140 can determine affinity for an album based on the specific artist, genre, etc., that appears most frequently in the album, as described above.

Example Process

Figure 3:
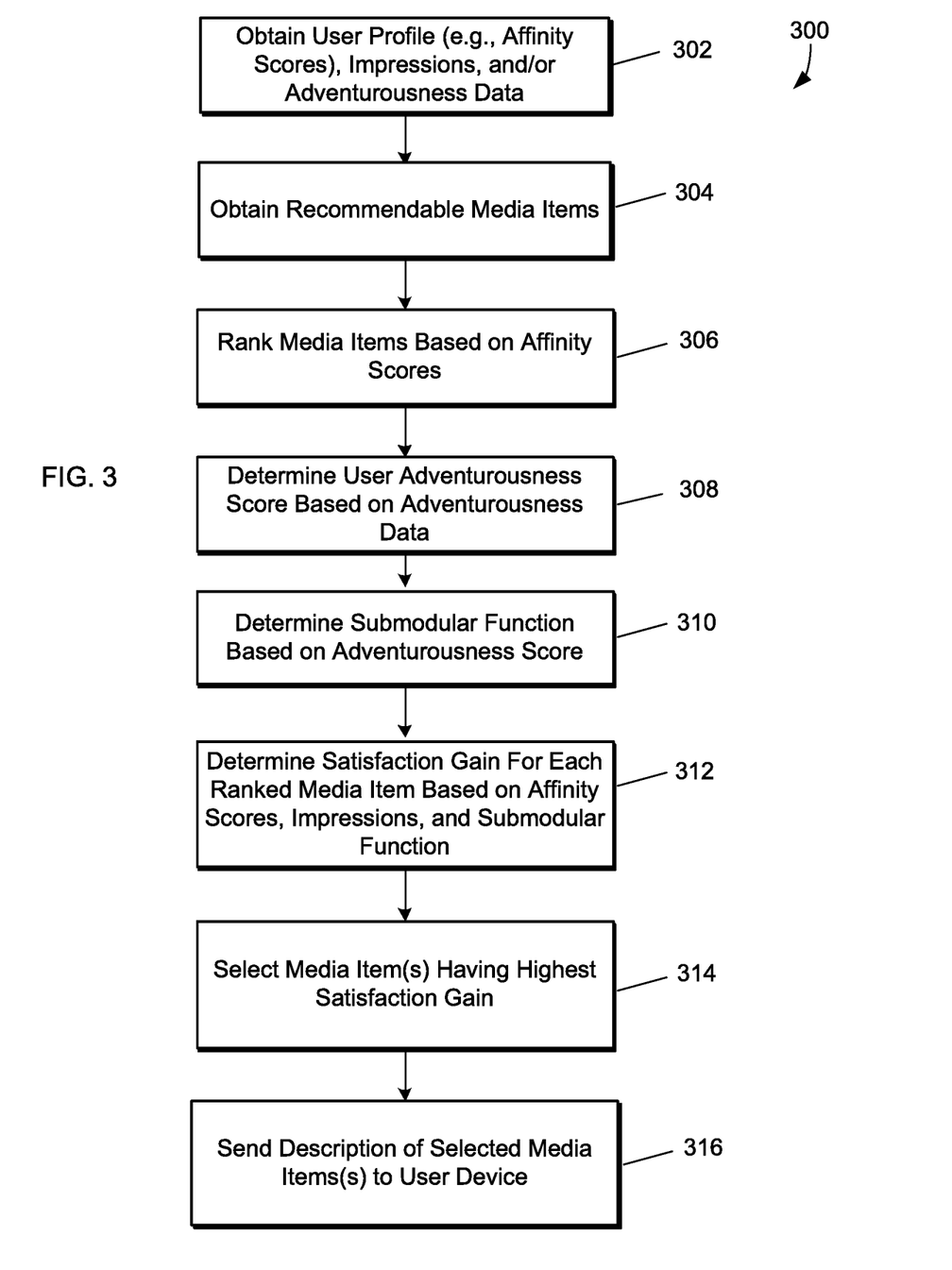
FIG. 3 is flow diagram of an example process for improving diversity in media item recommendations.

FIG. 3 is flow diagram of an example process 300 for improving diversity in media item recommendations. For example, process 300 can be performed by a computing device (e.g., server device 130) to generate media item suggestions that are both relevant and more interesting to the user. By generating media item suggestions with more diversity, the computing device can alleviate or prevent boredom the user may experience when viewing the same suggestions over and over again.

At step 302, the computing device can obtain a user profile, impressions data, and/or adventurousness data associated with the user of a requesting user device. For example, user device 110 can request media item suggestions from server device 130 and provide an identifier for the use of user device 110. Server device 130 can obtain the user profile for the identified user from user profiles database 132. The user profile can include the affinity scores. Server device 130 can obtain impressions data from impressions database 138, and/or adventurousness data (e.g., churn count, play duration, adventurousness score, etc.) from adventurousness database 136, as described above.

At step 304, the computing device can obtain recommendable media items. For example, server device 130 can obtain recommendable media items from recommendable media items database 134. Each media item in recommendable media item database can include or be associated with metadata describing various characteristics, categories and/or attributes of the media item. The metadata can, for example, describe the artists, actors, genres, directors, etc., associated with the media item.

At step 306, the computing device can rank media items based on affinity scores associated with the user. For example, server device 130 can generate candidate media items list 148 from the media items in recommendable media items database 134 based on the category affinity scores and the metadata for each media item in recommendable media item database, as described in detail above. Server device 130 can generate an overall affinity score for each media item based on the user's affinity scores and then rank or order each media item according to the media item's affinity score to generate candidate media items 148.

At step 308, the computing device can determine a user adventurousness score based on the adventurousness data. For example, server device 130 can determine the adventurousness score for the user based on the churn count, play duration, age, and/or other demographics associated with the user.

At step 310, the computing device can determine a submodular function for determining satisfaction gain based on the user's adventurousness score. For example, the submodular function can be an exponential function where the value of the exponent is determined based on the adventurousness score for the user. Thus, the submodular function may change from user to user as each user's adventurousness score may be different.

At step 312, the computing device can determine the satisfaction gain for each ranked media item. For example, server device 130 can determine or estimate the satisfaction gain that will likely be experienced by the user when the user views a new media item suggestion based on the affinity scores, candidate media item attribute vectors, and/or submodular function, as described above.

At step 314, the computing device can select media item(s) having the highest satisfaction gain for presentation to the user. For example, server device 130 can select the media items that will produce the highest satisfaction gain for presentation to the user. Since the satisfaction gain is dependent on the adventurousness score for each user, the satisfaction gain experienced by two different users may be different depending on how adventurous each user is.

At step 316, the computing device can send a description of the selected media item(s) to the user device. For example, after server device 130 selects media items based on the satisfaction gain calculation, server device 130 can send metadata describing the media items to user device 110 for presentation to the user. Upon receipt of the selection media item metadata, media application 112 can present the media item suggestions on user device 110.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 4:
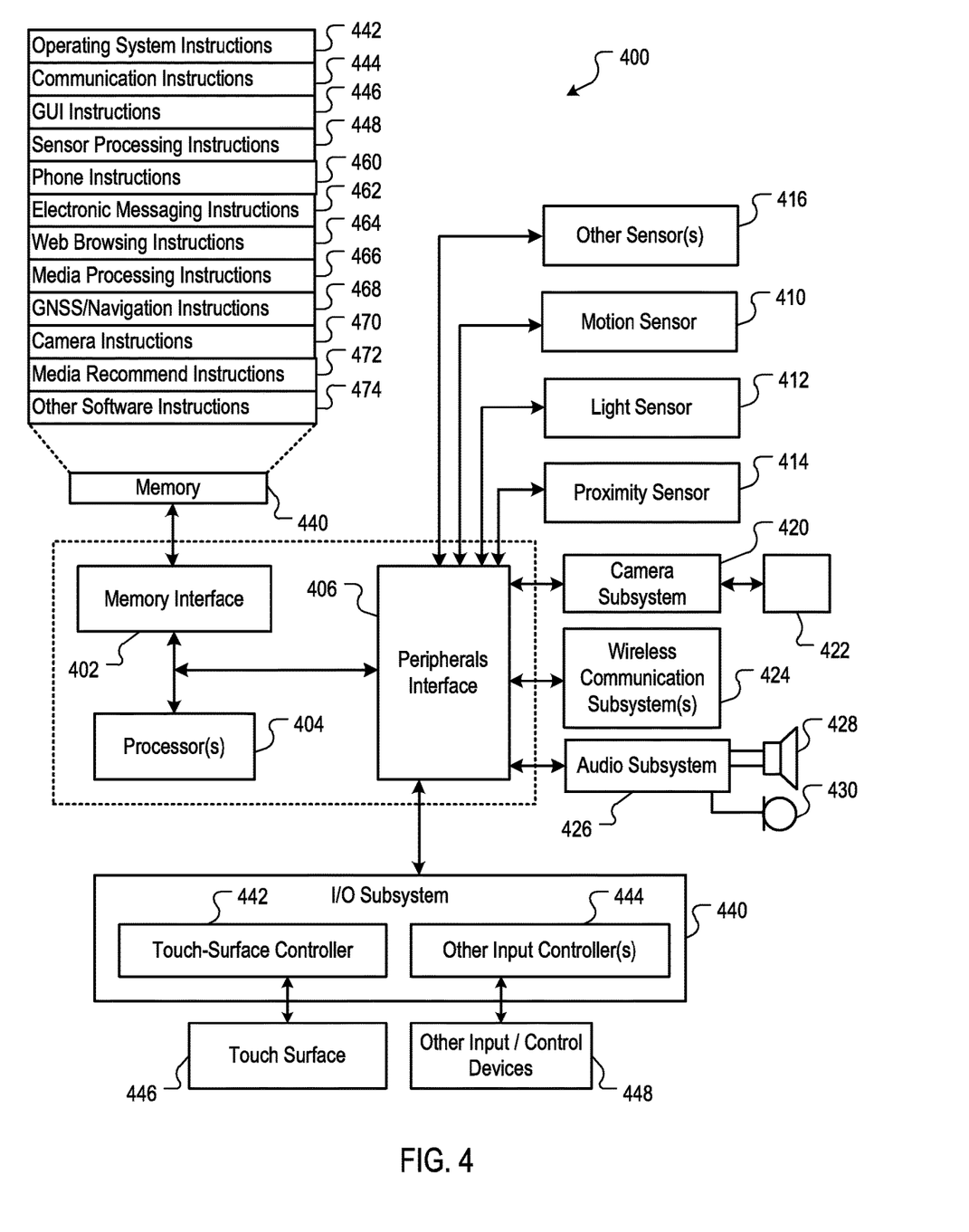
FIG. 4 is a block diagram of an example computing device that can implement the features and processes of FIGS. 1-3.

FIG. 4 is a block diagram of an example computing device 400 that can implement the features and processes of FIGS. 1-3. The computing device 400 can include a memory interface 402, one or more data processors, image processors and/or central processing units 404, and a peripherals interface 406. The memory interface 402, the one or more processors 404 and/or the peripherals interface 406 can be separate components or can be integrated in one or more integrated circuits. The various components in the computing device 400 can be coupled by one or more communication buses or signal lines.

Sensors, devices, and subsystems can be coupled to the peripherals interface 406 to facilitate multiple functionalities. For example, a motion sensor 410, a light sensor 412, and a proximity sensor 414 can be coupled to the peripherals interface 406 to facilitate orientation, lighting, and proximity functions. Other sensors 416 can also be connected to the peripherals interface 406, such as a global navigation satellite system (GNSS) (e.g., GPS receiver), a temperature sensor, a biometric sensor, magnetometer or other sensing device, to facilitate related functionalities.

A camera subsystem 420 and an optical sensor 422, e.g., a charged coupled device (CCD) or a complementary metal-oxide semiconductor (CMOS) optical sensor, can be utilized to facilitate camera functions, such as recording photographs and video clips. The camera subsystem 420 and the optical sensor 422 can be used to collect images of a user to be used during authentication of a user, e.g., by performing facial recognition analysis.

Communication functions can be facilitated through one or more wireless communication subsystems 424, which can include radio frequency receivers and transmitters and/or optical (e.g., infrared) receivers and transmitters. The specific design and implementation of the communication subsystem 424 can depend on the communication network(s) over which the computing device 400 is intended to operate. For example, the computing device 400 can include communication subsystems 424 designed to operate over a GSM network, a GPRS network, an EDGE network, a Wi-Fi or WiMax network, and a Bluetooth™ network. In particular, the wireless communication subsystems 424 can include hosting protocols such that the device 100 can be configured as a base station for other wireless devices.

An audio subsystem 426 can be coupled to a speaker 428 and a microphone 430 to facilitate voice-enabled functions, such as speaker recognition, voice replication, digital recording, and telephony functions. The audio subsystem 426 can be configured to facilitate processing voice commands, voiceprinting and voice authentication, for example.

The I/O subsystem 440 can include a touch-surface controller 442 and/or other input controller(s) 444. The touch-surface controller 442 can be coupled to a touch surface 446. The touch surface 446 and touch-surface controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 446.

The other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of the speaker 428 and/or the microphone 430.

In one implementation, a pressing of the button for a first duration can disengage a lock of the touch surface 446; and a pressing of the button for a second duration that is longer than the first duration can turn power to the computing device 400 on or off. Pressing the button for a third duration can activate a voice control, or voice command, module that enables the user to speak commands into the microphone 430 to cause the device to execute the spoken command. The user can customize a functionality of one or more of the buttons. The touch surface 446 can, for example, also be used to implement virtual or soft buttons and/or a keyboard.

In some implementations, the computing device 400 can present recorded audio and/or video files, such as MP3, AAC, and MPEG files. In some implementations, the computing device 400 can include the functionality of an MP3 player, such as an iPod™. The computing device 400 can, therefore, include a 36-pin connector that is compatible with the iPod. Other input/output and control devices can also be used.

The memory interface 402 can be coupled to memory 450. The memory 450 can include high-speed random access memory and/or non-volatile memory, such as one or more magnetic disk storage devices, one or more optical storage devices, and/or flash memory (e.g., NAND, NOR). The memory 450 can store an operating system 452, such as Darwin, RTXC, LINUX, UNIX, OS X, WINDOWS, or an embedded operating system such as VxWorks.

The operating system 452 can include instructions for handling basic system services and for performing hardware dependent tasks. In some implementations, the operating system 452 can be a kernel (e.g., UNIX kernel). In some implementations, the operating system 452 can include instructions for performing voice authentication. For example, operating system 452 can implement the media item recommendation features as described with reference to FIGS. 1-3.

The memory 450 can also store communication instructions 454 to facilitate communicating with one or more additional devices, one or more computers and/or one or more servers. The memory 450 can include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GNSS/Navigation instructions 468 to facilitate GNSS and navigation-related processes and instructions; and/or camera instructions 470 to facilitate camera-related processes and functions.

The memory 450 can store other software instructions 472 to facilitate other processes and functions, such as the media item recommendation processes and functions as described with reference to FIGS. 1-3.

The memory 450 can also store other software instructions 474, such as web video instructions to facilitate web video-related processes and functions; and/or web shopping instructions to facilitate web shopping-related processes and functions. In some implementations, the media processing instructions 466 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 450 can include additional instructions or fewer instructions. Furthermore, various functions of the computing device 400 can be implemented in hardware and/or in software, including in one or more signal processing and/or application specific integrated circuits.

In some implementations, embodiments can include a method comprising: receiving, by a computing device, a request for media items to recommend to a user of a user device; obtaining, by the computing device, recommendable media items; ranking, by the computing device, the recommendable media items according to affinity scores associated with the user; generating, by the computing device, an adventurousness score for the user based on a churn count associated with the user; determining, by the computing device, a submodular function for generating a satisfaction gain score for the user, the submodular function determined based on the adventurousness score; calculating, by the computing device, a satisfaction gain score for each media item in the ranked media items; selecting, by the computing device, media items to suggest to the user based on the satisfaction gain calculated for each media item in the ranked media items.

We claim:

1. A method comprising:
receiving, by a computing device, a request for media items to recommend to a user of a user device;
obtaining, by the computing device, recommendable media items;
ranking, by the computing device, the recommendable media items according to affinity scores associated with the user;
generating, by the computing device, an adventurousness score for the user that indicates a magnitude of willingness of the user to explore or experience different media content than has been previously consumed by the user, wherein the adventurousness score is based on a churn count associated with the user, wherein the churn count represents a number of times the user has selected a media item associated with a new media item category not previously selected by the user within a time period;
calculating, by the computing device, a satisfaction gain score for each media item in the ranked media items based at least in part upon the adventurousness score and the ranking; and
selecting and providing, by the computing device, a portion of the recommendable media items to recommend to the user based on the satisfaction gain score calculated for each media item in the ranked media items.

2. The method of claim 1, wherein the affinity scores are calculated based on the user's previous media item selections and represent the user's preference for media items of a particular category.

3. The method of claim 1, wherein generating the adventurousness score for the user includes:
determining one or more characteristics of the user; and
grouping the user into a group with other users based on the one or more characteristics of the user.

4. The method of claim 3, wherein the one or more characteristics include an average amount of time that the user plays media items, an age of the user, a geographic location of the user, or a combination thereof.

5. The method of claim 3, further comprising:
ordering users within the group based on the churn count; and
generating the adventurousness score for the user based on a position of the user within the ordered group.

6. The method of claim 1, wherein calculating the satisfaction gain score for each media item in the ranked media items comprises:
determining a number of times a media item associated with a particular media item category has been viewed by the user;
providing the number as input to a submodular function for generating a satisfaction gain score for the user, wherein the submodular function is determined based on the adventurousness score; and
calculating the satisfaction gain score based on a result of the submodular function.

7. The method of claim 1, comprising determining the satisfaction gain score based on a satisfaction gain for a genre of content.

8. A non-transitory computer-readable medium including one or more sequences of instructions that, when executed by one or more processors, cause the processors to perform operations comprising:
receiving, by a computing device, a request for media items to recommend to a user of a user device;
obtaining, by the computing device, recommendable media items;
ranking, by the computing device, the recommendable media items according to affinity scores associated with the user;
generating, by the computing device, an adventurousness score for the user that indicates a magnitude of willingness of the user to explore or experience different media content than has been previously consumed by the user, wherein the adventurousness score is based on a churn count associated with the user, wherein the churn count represents a number of times the user has selected a media item associated with a new media item category not previously selected by the user within a time period;

calculating, by the computing device, a satisfaction gain score for each media item in the ranked media items based at least in part upon the adventurousness score and the ranking; and selecting and providing, by the computing device, a portion of the recommendable media items to recommend to the user based on the satisfaction gain score calculated for each media item in the ranked media items.

9. The non-transitory computer-readable medium of claim 8, wherein the affinity scores are calculated based on the user's previous media item selections and represent the user's preference for media items of a particular category.

10. The non-transitory computer-readable medium of claim 8, wherein the instructions that cause generating the adventurousness score for the user include instructions that cause:

determining one or more characteristics of the user; and grouping the user into a group with other users based on the one or more characteristics of the user.

11. The non-transitory computer-readable medium of claim 10, wherein the one or more characteristics include an average amount of time that the user plays media items, an age of the user, a geographic location of the user, or a combination thereof.

12. The non-transitory computer-readable medium of claim 10, wherein the instructions cause:

ordering users within the group based on the churn count; and generating the adventurousness score for the user based on a position of the user within the ordered group.

13. The non-transitory computer-readable medium of claim 8, wherein the instructions that cause calculating the satisfaction gain score for each media item in the ranked media items include instructions that cause:

determining a number of times a media item associated with a particular media item category has been viewed by the user;

providing the number as input to a submodular function for generating a satisfaction gain score for the user, wherein the submodular function is determined based on the adventurousness score; and calculating the satisfaction gain score based on a result of the submodular function.

14. A system comprising:

one or more processors; and a non-transitory computer-readable medium including one or more sequences of instructions that, when executed by the one or more processors, cause the processors to perform operations comprising:

receiving, by a computing device, a request for media items to recommend to a user of a user device;

obtaining, by the computing device, recommendable media items;

ranking, by the computing device, the recommendable media items according to affinity scores associated with the user;

generating, by the computing device, an adventurousness score for the user that indicates a magnitude of willingness of the user to explore or experience different media content than has been previously consumed by the user, wherein the adventurousness score is based on a churn count associated with the user wherein the churn count represents a number of times the user has selected a media item associated with a new media item category not previously selected by the user within a time period;

calculating, by the computing device, a satisfaction gain score for each media item in the ranked media items based at least in part upon the adventurousness score and the ranking; and selecting and providing, by the computing device, a portion of the recommendable media items to recommend to the user based on the satisfaction gain score calculated for each media item in the ranked media items.

15. The system of claim 14, wherein the affinity scores are calculated based on the user's previous media item selections and represent the user's preference for media items of a particular category.

16. The system of claim 14, wherein the instructions that cause generating the adventurousness score for the user include instructions that cause:

determining one or more characteristics of the user; and grouping the user into a group with other users based on the one or more characteristics of the user.

17. The system of claim 16, wherein the one or more characteristics include an average amount of time that the user plays media items, an age of the user, and a geographic location of the user.

18. The system of claim 16, wherein the instructions cause:

ordering users within the group based on the churn count; and generating the adventurousness score for the user based on a position of the user within the ordered group.

19. The system of claim 14, wherein the instructions that cause calculating the satisfaction gain score for each media item in the ranked media items include instructions that cause:

determining a number of times a media item associated with a particular media item category has been viewed by the user;

providing the number as input to a submodular function for generating a satisfaction gain score for the user, wherein the submodular function is determined based on the adventurousness score; and calculating the satisfaction gain score based on a result of the submodular function.

20. The system of claim 14, wherein the churn count represents a number of times the user has viewed, for at least a threshold amount of time, the media item associated with the new media item category not previously viewed by the user within the time period.

21. The system of claim 20, wherein the threshold amount of time comprises at least twenty seconds.

* * * * *